United States Patent
Kerr et al.

(10) Patent No.: US 12,406,101 B2
(45) Date of Patent: Sep. 2, 2025

(54) METHOD AND APPARATUS FOR INTEGRATED INFORMATION TECHNOLOGY SERVICES MANAGEMENT CONTROLLER

(71) Applicant: Google LLC, Mountain View, CA (US)

(72) Inventors: Benjamin James Ogden Kerr, Danville, CA (US); Rohit Mittal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 17/982,579

(22) Filed: Nov. 8, 2022

(65) Prior Publication Data

US 2024/0152657 A1    May 9, 2024

(51) Int. Cl.
*G06F 21/85*    (2013.01)
*G06F 21/76*    (2013.01)

(52) U.S. Cl.
CPC .............. *G06F 21/85* (2013.01); *G06F 21/76* (2013.01)

(58) Field of Classification Search
CPC ...... G06F 21/85; G06F 21/76; G06F 15/7807; G06F 15/17; G06F 15/17306
See application file for complete search history.

(56) References Cited

U.S. PATENT DOCUMENTS

| | | |
|---|---|---|
| 9,197,490 B2 | 11/2015 | Dharmadhikari et al. |
| 9,652,216 B2 | 5/2017 | Dharmadhikari et al. |
| 10,069,718 B2 | 9/2018 | Khemani et al. |
| 10,430,082 B2 | 10/2019 | Liu et al. |
| 11,388,054 B2 | 7/2022 | Guim Bernat et al. |
| 2015/0120971 A1 | 4/2015 | Bae et al. |
| 2018/0077516 A1 | 3/2018 | Viswanathan et al. |
| 2018/0130733 A1* | 5/2018 | Richard ................ H01L 24/11 |
| 2020/0035593 A1* | 1/2020 | Call ..................... H01L 21/4857 |
| 2022/0180468 A1* | 6/2022 | Matam ................ G06F 13/4027 |
| 2022/0417005 A1* | 12/2022 | Patel ..................... H04L 9/0822 |
| 2023/0081139 A1* | 3/2023 | Valavala ............... H01L 25/105 |
| | | 257/776 |
| 2024/0105545 A1* | 3/2024 | Lu ........................ H01L 25/0652 |
| 2024/0105704 A1* | 3/2024 | Zhong ................. H01L 25/0655 |

FOREIGN PATENT DOCUMENTS

WO    2022139828 A1    6/2022

OTHER PUBLICATIONS

Extended European Search Report for European Patent Application No. 23173590.3 dated Mar. 22, 2024. 10 pages.

(Continued)

*Primary Examiner* — Mohammad W Reza
(74) *Attorney, Agent, or Firm* — Lerner David LLP

(57) ABSTRACT

Aspects of the disclosure are directed to combining an information technology services management (ITSM) controller with one or more processing units into a single integrated circuit via chiplets. An ITSM chiplet can connect to one or more processing unit chiplets via one or more respective die-to-die (D2D) interconnects that physically isolate the ITSM chiplet from the processing unit chiplet. Including the ITSM chiplet with the processing unit chiplets in an integrated circuit can save cost, increase reliability, and reduce assembly time.

19 Claims, 5 Drawing Sheets

(56) References Cited

OTHER PUBLICATIONS

Vashistha, N., et al., "ToSHI—Towards Secure Heterogeneous Integration: Security Risks, Threat Assessment, and Assurance", International Association for Cryptologic Research, Aug. 2022. pp. 1-23.

Anonymous. IT service management—Wikipedia. Oct. 8, 2022 (Oct. 8, 2022), pp. 1-4. Retrieved from the Internet: <https://en.wikipedia.org/w/index.php? title=IT_service_management&oldid=1114765683>. [retrieved on Nov. 26, 2024].

Joe the IT Guy. ITSM Views from a Vendor, with Patrick Bolger from Hornbill. Dec. 12, 2013 (Dec. 12, 2013), pp. 1-5. Retrieved from the Internet: <https://www.joetheitguy.com/itsm-views-from-a-vendor-with-patrick-bolger-from-hornbill/>. [retrieved on Nov. 26, 2024].

Office Action for European Patent Application No. 23173590.3 dated Dec. 9, 2024. 7 pages.

* cited by examiner

METHOD AND APPARATUS FOR INTEGRATED INFORMATION TECHNOLOGY SERVICES MANAGEMENT CONTROLLER

BACKGROUND

Servers in a datacenter can be provisioned, managed and monitored via a baseband management controller (BMC), which is part of a general integrated information technology services management (ITSM) controller. The BMC can be a separately assembled module for a printed circuit board (PCB), where the BMC module is physically installed into a server in the datacenter, such as by soldering to the PCB or plugging into the PCB. Once installed, the BMC can communicate with the server via a number of external interfaces, such as inter-integrated circuit (I2C) or system management bus (SMB) signals or a peripheral component interconnect express (PCIe) interface. However, installing the BMC module during server assembly can be costly and time consuming. Further, having a separately assembled BMC module introduces a potential failure point in the server.

BRIEF SUMMARY

Aspects of the disclosure are directed to combining an information technology services management (ITSM) controller with one or more processing units into a single integrated circuit via chiplets. An ITSM chiplet can connect to one or more processing unit chiplets via one or more respective die-to-die (D2D) interconnects that physically isolate the ITSM chiplet from the processing unit chiplet. Including the ITSM chiplet with the processing unit chiplets in an integrated circuit can save cost, increase reliability, and reduce assembly time.

An aspect of the disclosure provides for an integrated circuit including: an information technology services management (ITSM) chiplet; and one or more processing unit chiplets; where the ITSM chiplet is connected to the one or more processing unit chiplets via a die-to-die (D2D) interconnect that physically isolates the ITSM chiplet from the one or more processing unit chiplets.

In an example, the ITSM chiplet is a segmented die fabricated with a particular functionality. In another example, the D2D physically isolates the ITSM chiplet from the one or more processing unit chiplets via an air gap.

In yet another example, the integrated circuit further includes a memory device, the memory device including at least one of a memory chiplet, memory component, or memory module. In yet another example, the memory device is connected to the ITSM chiplet via a die-to-memory (D2M) interconnect. In yet another example, the integrated circuit further includes a system root of trust (RoT) configured to provide a security foundation for the one or more processing unit chiplets. In yet another example, the ITSM chiplet includes the system RoT or the ITSM chiplet is connected to the system RoT.

In yet another example, the one or more processing unit chiplets include a plurality of processing unit chiplets and the ITSM chiplet includes a plurality of D2D interfaces to separately connect to each processing unit chiplet via a respective D2D interconnect. In yet another example, the ITSM chiplet is configured to at least one of provision, manage, maintain, or monitor a server. In yet another example, ITSM chiplet further includes a virtualization offload accelerator configured to perform hypervisor software functionality.

Another aspect of the disclosure provides for a system including: a plurality of integrated circuits. Each integrated circuit includes: an information technology services management (ITSM) chiplet; and one or more processing unit chiplets; where the ITSM chiplet is connected to the one or more processing unit chiplets via a die-to-die (D2D) interconnect that physically isolates the ITSM chiplet from the one or more processing unit chiplets. The plurality of integrated circuits are connected by a daisy-chain of network interfaces.

In an example, an integrated circuit of the plurality of integrated circuits includes a real network interface exposed to a provisioning network. In another example, remaining integrated circuits of the plurality of integrated circuits each include a shared network interface. In yet another example, each ITSM chiplet further includes a network switch configured to route provisioning traffic.

In yet another example, each ITSM chiplet is a segmented die of a respective integrated circuit and fabricated with a particular functionality. In yet another example, each integrated circuit further includes a memory device, each memory device including at least one of a memory chiplet, memory component, or memory module. In yet another example, each memory device is connected to its respective ITSM chiplet via a die-to-memory (D2M) interconnect. In yet another example, each ITSM chiplet further includes a virtualization offload accelerator configured to perform hypervisor software functionality.

Yet another aspect of the disclosure provides for a method for assembling an integrated circuit. The method includes providing an information technology services management (ITSM) chiplet; providing one or more processing unit chiplets; and connecting the ITSM chiplet to the one or more processing unit chiplets via a die-to-die (D2D) interconnect that physically isolates the ITSM chiplet from the one or more processing unit chiplets.

In an example, the method further includes: providing a memory device, the memory device comprising at least one of a memory chiplet, memory component, or memory module; and connecting the memory device to the ITSM chiplet via a die-to-memory (D2M) interconnect.

DETAILED DESCRIPTION

Figure 1:
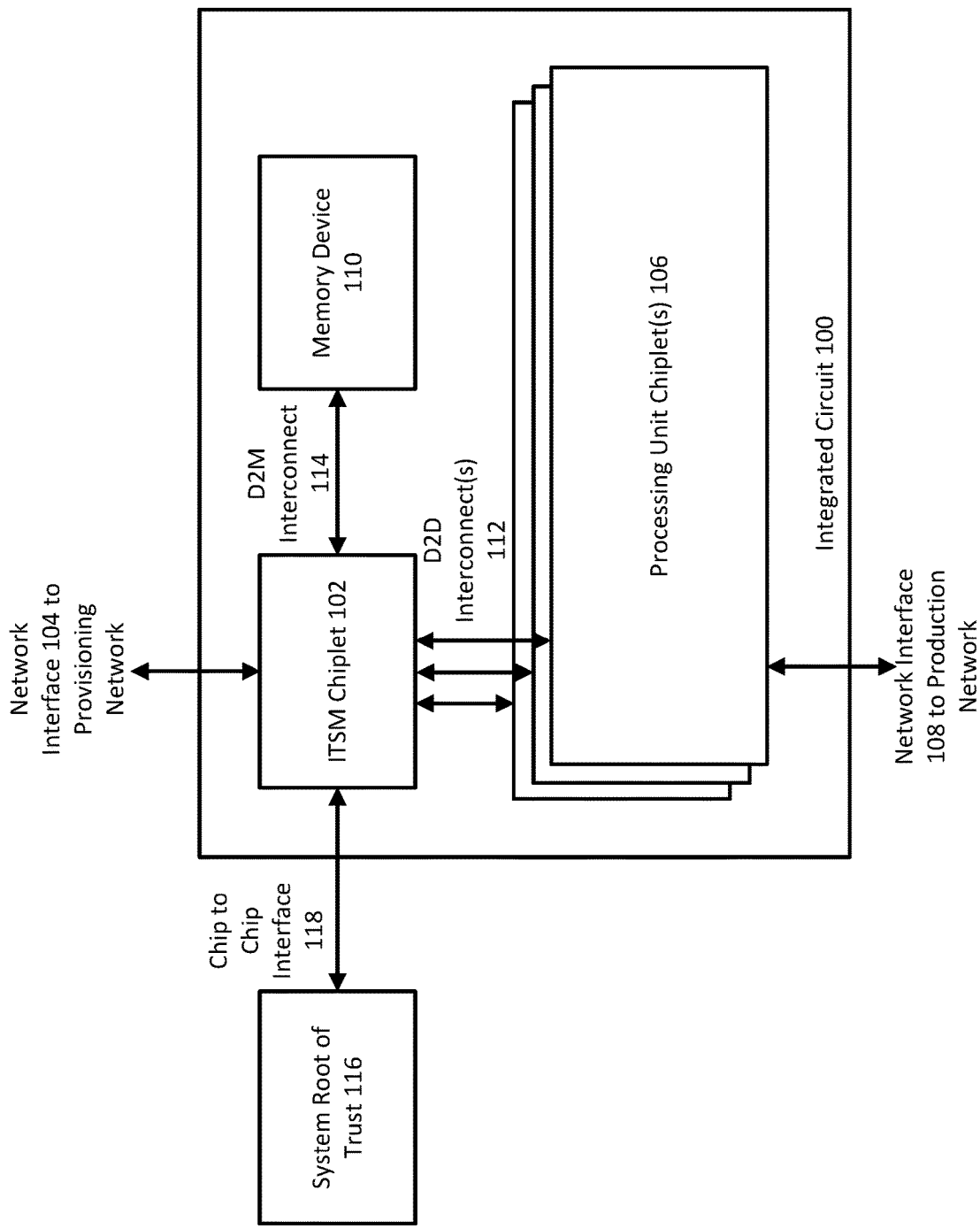
FIG. 1 depicts a block diagram of an example integrated circuit according to aspects of the disclosure.

Generally disclosed herein are implementations for combining an information technology services management (ITSM) module, such as a baseband management controller (BMC), with one or more processing units into a single integrated circuit via chiplets. Chiplets can segment integrated circuits into a number of separate die. Including the ITSM module with the processing units as respective chiplets can save cost, increase reliability, and reduce server assembly time.

The ITSM module can be configured to provision, manage, maintain, and/or monitor servers in a datacenter. There can be one or more instances of the ITSM module on each server deployed in the datacenter. The ITSM module can be connected to a provisioning network for receiving instructions to provision, manage, maintain, and/or monitor its respective server. The ITSM can be physically separated from a production network, which transports service data to and from the server. The physical separation can provide a demonstrable security barrier between the provisioning network and production network.

The integrated circuit includes an information technology services management (ITSM) chiplet, one or more processing unit chiplets, and a memory device. The ITSM chiplet can be any logic circuitry configured to provision, manage, maintain, and/or monitor servers in a datacenter based on instructions received from the provisioning network. The processing unit chiplets can be any logic circuitry configured to execute instructions received from the production network. The memory device can be any device suitable for storing computer readable data for the ITSM chiplet.

The ITSM chiplet can be assembled together with the processing unit chiplets to generate a single heterogeneous integrated circuit. The integrated circuit can be mounted on a server printed circuit board (PCB) without the need for installing a separate ITSM module. The memory device can also be assembled together with the integrated circuit or separately mounted on the server PCB.

The ITSM chiplet connects to the processing unit chiplets via a die-to-die (D2D) interconnect. The D2D interconnect can include a physical separation, such as an air-gap, to physically isolate the ITSM chiplet from the processing unit chiplet. The air-gap provides more security for cloud/multi-user applications that utilize servers in a datacenter containing the ITSM and processing unit chiplets. If there are multiple processing unit chiplets, then the ITSM chiplet can include multiple D2D interfaces to manage each processing unit chiplet separately. The ITSM chiplet connects to the memory device via a die-to-memory (D2M) interconnect. The D2M interconnect can also include a physical separation, such as an air-gap, to physically isolate the ITSM chiplet from the memory device.

The ITSM chiplet can connect to a system root of trust (RoT), which can provide security foundation for the processing unit chiplets. The ITSM chiplet can connect to the system RoT via an interface. The RoT can be included in the ITSM chiplet, assembled together as a separate chiplet, with the single heterogeneous integrated circuit, or separately mounted on the server PCB.

For virtual machine management, hypervisor functionality can be moved to a virtualization offload accelerator process on the ITSM chiplet. Hypervisor software functionality can be moved to the ITSM chiplet while hypervisor hardware functionality can remain on the hardware processing unit. Hypervisor software functionality can include hardware provisioning, general processor provisioning, datacenter network provisioning, and/or accelerator provisioning. Hypervisor hardware functionality can include memory management, memory protection, encryption and/or virtualization extensions.

Other functionality can also be moved to the ITSM chiplet, such as basic input/output system (BIOS) updates, power cycling, thermal measurements and reporting, over/underclock configurations, and/or fan control.

If multiple processing unit sockets need to communicate to the provisioning network, the network connections can be daisy-chained to only expose a single network interface to the provisioning network. Two network interfaces can be exposed such that one integrated circuit has a real network interface to the provisioning network and the other integrated circuits have a shared network interface that also connects to the integrated circuit with the real network interface. Provisioning traffic can be routed to the correct ITSM chiplet via network switches.

By combining an ITSM chiplet with processing unit chiplets in an integrated circuit, every processing unit socket instance in a server can include its own ITSM chiplet. This increases flexibility by allowing for the servers in a datacenter to be provisioned at the processing unit level, rather than at the server level.

FIG. 1 depicts a block diagram of an example integrated circuit 100. The integrated circuit 100 can be mounted on a PCB as a part of a server, such as in a datacenter. The integrated circuit 100 can include a plurality of chiplets that segment the integrated circuit into a number of separate die, each die being fabricated for one or more specific functions. The integrated circuit 100, and its segmented die, can be formed of silicon, silicon on insulator, gallium arsenide, and/or diamond, as examples.

Chiplets can allow each segmented die to be constructed using different process technology nodes. Older nodes tend to be less expensive and can have higher yields than new nodes. Therefore, commodity functionality, such as the ITSM, can be built using older processing nodes while high performance CPUs or accelerators can be built using newer processing nodes, providing greater flexibility in integrated circuit manufacturing. Chiplets also yield better than large monolithic die and have a lower probability of manufacturing defects.

The integrated circuit can include an ITSM chiplet 102. The ITSM chiplet 102 can correspond to a BMC chiplet, which can include intelligent platform management interface (IPMI) processor die, reduced instruction set computer (RISC) die, and/or RISC-V die.

The ITSM chiplet 102 can be configured to provision, manage, maintain, and/or monitor servers, such as in a datacenter. Provisioning can correspond to dividing available resources from the servers across services requiring those resources. Services can include cloud computing services, such as infrastructure as a service (IaaS), platform as a service (PaaS), and/or software as a service (SaaS). For example, the cloud computing services can provide software applications for accounting, word processing, inventory tracking, etc. Managing can correspond to reporting when provisioned resources from the servers are available and ready for use by the services as well as releasing provisioned resources when they are no longer required for use by the services. Maintaining can correspond to detecting any provisioned resource conflicts, over-usage of provisioned resources, and/or performing security credential checks. Monitoring can correspond to checking server level aspects, such as server temperature, integrated circuit temperature, fan speed, power supply voltages. Monitoring can also correspond to detecting server errors, such as memory errors or crashes, and/or handling emergency situations, such as power loss.

The ITSM chiplet 102 can be connected to a provisioning network for receiving instructions and sending results related to provisioning, managing, maintaining, and/or monitoring the servers. The ITSM chiplet 102 can be connected via a network interface 104, such as Ethernet, Infiniband, or PCIe. The provisioning network can include the Internet, a local network, a network fabric, or any other local area or wide area network. The provisioning network can be composed of multiple connected sub-networks or autonomous networks. The provisioning network can be a local area network (LAN), such as a company intranet, a metropolitan area network (MAN), a wide area network (WAN), an inter-network, such as the Internet, or a peer-to-peer network. Any type and/or form of data network and/or communication network can be used for the provisioning network.

The ITSM chiplet 102 can further include an intelligent platform management bus (IPMB) and/or an intelligent chassis management bus (ICMB). The IPMB can correspond to a communication protocol for facilitating communication between controllers, such as facilitating communication between different ITSM chiplets at different servers in a datacenter. The ICMB can correspond to an interface protocol for supporting communication across chasses, such as supporting communication between the ITSM chiplet 102 and other chiplets/devices on the integrated circuit 100.

The integrated circuit 100 can further include one or more processing unit chiplets 106. The processing unit chiplets 106 can correspond to any logic circuitry configured to execute instructions for one or more services, such as the example cloud computing services described earlier. The processing unit chiplets 106 can include central processing unit (CPU) die, accelerator die, and/or system on chip (SoC) die, as examples.

The processing unit chiplets 106 can be connected to a production network, which transports service data related to the one or more services to and from the server. The processing unit chiplets 106 can be connected via a network interface 108, such as Ethernet, Infiniband, or PCIe. The production network can include the Internet, a local network, a network fabric, or any other local area or wide area network. The production network can be composed of multiple connected sub-networks or autonomous networks. The production network can be a local area network (LAN), such as a company intranet, a metropolitan area network (MAN), a wide area network (WAN), an inter-network, such as the Internet, or a peer-to-peer network. Any type and/or form of data network and/or communication network can be used for the production network.

The integrated circuit 100 can also include a memory device 110 for storing data and/or instructions related to the ITSM chiplet 102. The memory device 110 can correspond to a memory chiplet, memory component, and/or memory module. The memory chiplet can be co-packaged with the ITSM chiplet 102 using more advanced packaging technology, for example, 2.5-dimension or silicon bridge packaging technologies. An example memory chiplet can be high bandwidth memory (HBM). The memory component can also be co-packaged with the ITSM chiplet 102 using less advanced packaging technology, such as multi-chip module (MCM) organic substrate packaging. An example memory component can be lower power double data rate dynamic random access memory (LPDDR DRAM). The memory module can be fitted on a PCB separate from the ITSM chiplet 102 and can include multiple memory components. An example memory module can be a dual in-line memory module (DIMM).

The ITSM chiplet 102 can be assembled together with the processing unit chiplets 106 to generate a single heterogeneous integrated circuit 100. The integrated circuit 100 can be mounted on a server PCB without the need for installing a separate ITSM module. The memory device 110 can also be assembled together with the single heterogeneous integrated circuit 100 or separately mounted on the server PCB.

The ITSM chiplet 102 can connect to the processing unit chiplets 106 via respective die-to-die (D2D) interconnects 112. Example D2D interconnects 112 can include a Universal Chiplet Interconnect Express (UCIe) or Open Compute Platform (OCP) Bunch-of-Wires (BoW) interface. The D2D interconnects 112 can include a physical separation, such as an air-gap, to physically isolate the ITSM chiplet 102 from the processing unit chiplets 106. The provisioning network is consequently physically isolated from the product network. The physical separation provides more security for services that utilize the servers containing the ITSM chiplet 102 and processing unit chiplets 106. The D2D interconnects 112 can be high bandwidth, such as in Gbits/sec, low latency, such as in nanoseconds, and/or low power, such as in pJ/bit. The D2D interconnects 112 also does not need to cover any PCB area, since the chiplet to chiplet connections can be contained within the boundary of the integrated circuit 100. If there are multiple processing unit chiplets 106, then the ITSM chiplet 102 can include multiple D2D interconnects 112 to manage each processing unit chiplet 106 separately.

The ITSM chiplet 102 can connect to the memory device 110 via a die-to-memory (D2M) interconnect 114, such as Open High Bandwidth Interface (OpenHBI) or HBM interface. The D2M interconnect 114 can include a physical separation, such as an air-gap, to physically isolate the ITSM chiplet 102 from the memory device 110. The D2M interconnect 114 can be high bandwidth, low latency, and/or low power. The D2M interconnect 114 also does not need to cover any PCB area, since the chiplet to chiplet connections can be contained within the boundary of the integrated circuit 100.

The ITSM chiplet 102 can connect to a system root of trust (RoT) 116. The system RoT 116 can provide security foundation for the processing unit chiplets 106. For example, the system RoT 116 can contain keys for cryptographic functions in the ITSM chiplet 102, to secure the processing unit chiplets 106. The system RoT 116 can be separately mounted on the server PCB, as depicted in FIG. 1, or can be included in the ITSM chiplet 102 or assembled together with the ITSM chiplet 102 as a separate chiplet in the integrated circuit 100. If separately mounted on the server PCB, the system RoT 116 can connect to the ITSM chiplet 102 via a chip-to-chip interface 118, such as a SPI, SMB, or I2C. If included in the ITSM chiplet 102 or assembled together with the ITSM chiplet 102 as a separate chiplet, the system RoT 116 can connect to the ITSM chiplet 102 via a D2D interconnect, such as a UCIe or OCP BoW interface.

By combining the ITSM chiplet 102 with the processing unit chiplets 106 in the integrated circuit 100, every processing unit socket instance in a server can include its own ITSM. This increases flexibility by allowing for the servers, such as in a datacenter, to be provisioned at the processing unit level, rather than at the server level.

Figure 2:
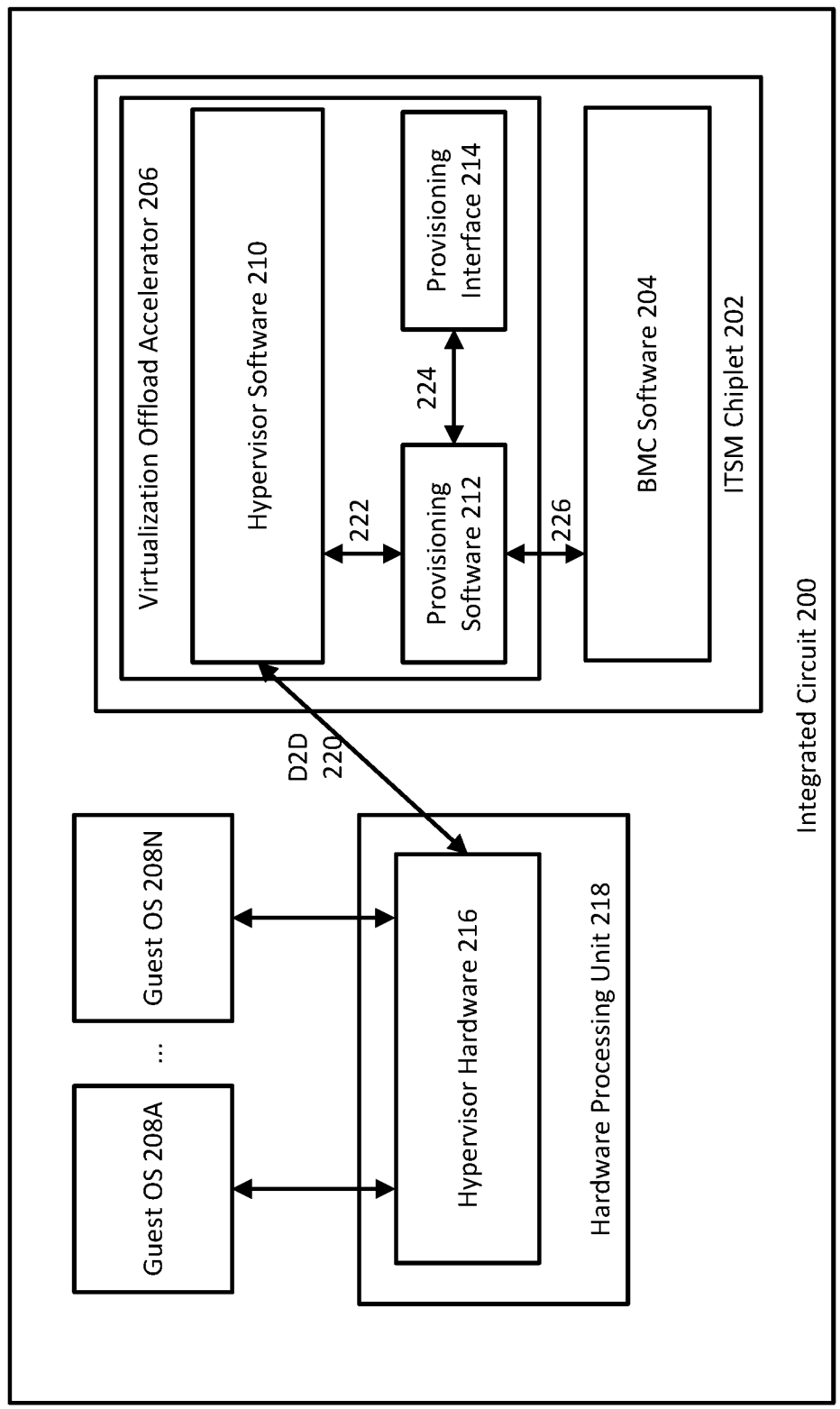
FIG. 2 depicts a block diagram of an example integrated circuit for offloading hypervisor functionality according to aspects of the disclosure.

ITSM chiplet 102 can exchange data with the processing unit chiplets 106 at a significantly higher bandwidth, enabling hypervisor software functionality to be moved to the ITSM chiplet 102. FIG. 2 depicts a block diagram of an example integrated circuit 200 for offloading hypervisor functionality when managing virtual machines for a cloud computing service. The integrated circuit 200 can correspond to the integrated circuit 100 as depicted in FIG. 1.

The integrated circuit 200 can include an ITSM chiplet 202, which can correspond to the ITSM chiplet 102 as depicted in FIG. 1. The ITSM chiplet 202 can include BMC software 204 and a virtualization offload accelerator 206. As described with respect to the ITSM chiplet 102 of FIG. 1, the BMC software 204 can be configured to provision, manage, maintain, and/or monitor servers, such as in a datacenter.

The virtualization offload accelerator 206 can be configured for some hypervisor functionality. Moving this hypervisor functionality to the ITSM chiplet 202 rather than including on a hardware processing unit increases flexibility and allows for more processing cycles to be available to any number of guest operating systems (OSs) 208, such as guest OS 208A to guest OS 208N, on any number of virtual machines. The guest OSs 208 can include software that controls the execution of individual server instances by corresponding virtual machines.

The virtualization offload accelerator 206 can include hypervisor software 210, provisioning software 212, and a provisioning interface 214. The hypervisor software 210 can include functionality such as hardware provisioning, general processor provisioning, datacenter network provisioning, and/or accelerator provisioning. Hardware provisioning can include determining how much memory each virtual machine should receive. General processor provisioning can include determining what central processing unit (CPU) or graphics processing unit (GPU) resources are available to respective virtual machines. Datacenter network provisioning can include configuring Internet protocol (IP) addresses. Accelerator provisioning can include enabling additional accelerators, such as machine learning accelerators, to be available to respective virtual machines.

The provisioning software 212 can include functionality that translates provisioning commands received over the provisioning interface 214 into specific operations to be performed on the hypervisor hardware 216. For example, a command may include allocating 128 GBytes of memory. This command can be received via the provisioning interface 214 and interpreted by the provisioning software 212 to program a hypervisor memory management unit to only expose a 128 GByte memory window to a virtual CPU instance.

The integrated circuit 200 can still include a hypervisor hardware 216 on a hardware processing unit 218, such as a bare metal CPU. The hypervisor hardware 216 can include functionality such as memory management, memory protection, encryption and/or virtualization extensions.

The hypervisor software 210 and hypervisor hardware 216 can connect via a D2D interface 220, such as a UCIe or OCP BoW interface. The hypervisor software 210 can connect to the provisioning software 212 via an internal software connection 222, such as a direct memory access (DMA) transfer or a control and status register (CSR). The provisioning software 212 can connect to the provisioning interface 214 and BMC software 204 via respective internal software connections 224, 226 as well.

Hypervisor software functionality 210 can be moved to the ITSM chiplet 202 while hypervisor hardware functionality 216 can remain on the hardware processing unit 218. While not shown in FIG. 2, other functionality can also be moved to the ITSM chiplet 202, such as basic input/output system (BIOS) updating, power cycling, thermal measuring and reporting, over/underclock configuring, and/or fan controlling.

Figure 3:
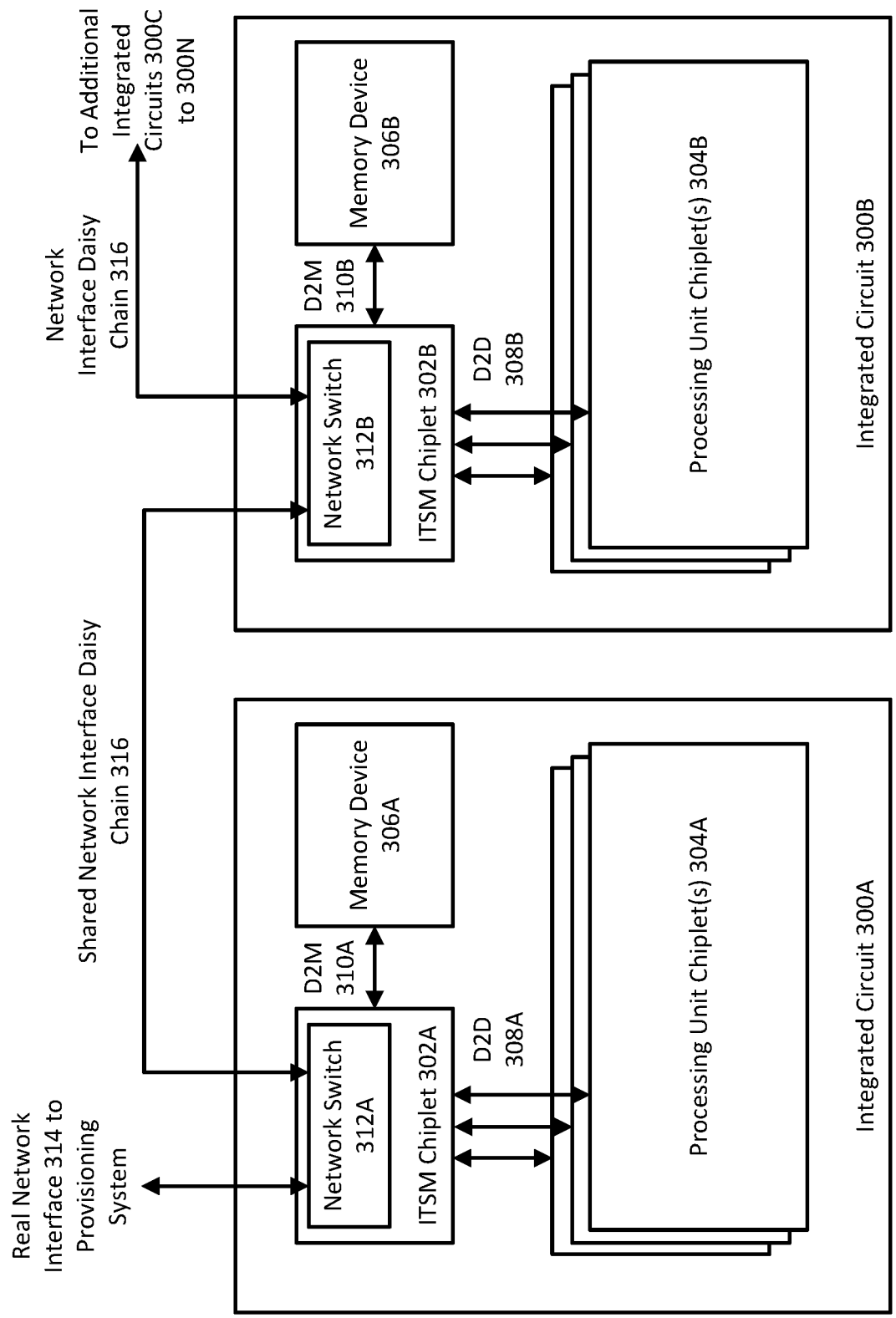
FIG. 3 depicts a block diagram of an example plurality of integrated circuits according to aspects of the disclosure.

FIG. 3 depicts a block diagram of an example plurality of integrated circuits 300 that can communicate to the provisioning network. Each integrated circuit 300 can correspond to the integrated circuit 100 as depicted in FIG. 1 or 200 as depicted in FIG. 2. While two integrated circuits 300A and 300B are shown for simplicity, any number of integrated circuits 300A to 300N can be included in the plurality of integrated circuits 300. As described earlier, each integrated circuit 300 can include an ITSM chiplet 302, depicted as 302A and 302B, one or more processing unit chiplets 304, depicted as 304A and 304B, and a memory device 306, depicted as 306A and 306B. The ITSM chiplet 302 can connect to the processing unit chiplets 304 via D2D interconnects 308, depicted as 308A and 308B, and the ITSM chiplet 302 can connect to the memory device 306 via a D2M interconnect 310, depicted as 310A and 310B.

Since the multiple integrated circuits 300 need to communicate to the provisioning network, network interfaces for the integrated circuits 300 can be daisy-chained such that only a single network interface is exposed to the provisioning network to provide additional security. Each integrated circuit 300 can include two network interfaces controlled by a network switch 312, depicted as 312A and 312B, in each ITSM chiplet 302.

The network switch 312 can correspond to a device with more than one network interface. The network switch 312 can examine ingress data packets received on a network interface and, based on the contents of the data packet, route the ingress data packets to a different egress network interface. Network switches can handle routing of millions of data packets per second. Example network interfaces can include Ethernet, Infiniband, or PCIe An integrated circuit, here 302A, of the plurality of integrated circuits can include a real network interface 314 and a shared network interface 316. The real network interface 314 can connect to the provisioning network while the shared network interface 316 can connect to another ITSM chiplet of another integrated circuit, here connected to ITSM chiplet 302B of integrated circuit 302B. The remaining integrated circuits, here 302B to 302N, of the plurality of integrated circuits can include two shared network interfaces 316, each of which connects to another ITSM chiplet of another integrated circuit in the plurality of integrated circuits. Provisioning traffic can be routed to the correct ITSM chiplet 302 via the network switches 312.

Figure 4:
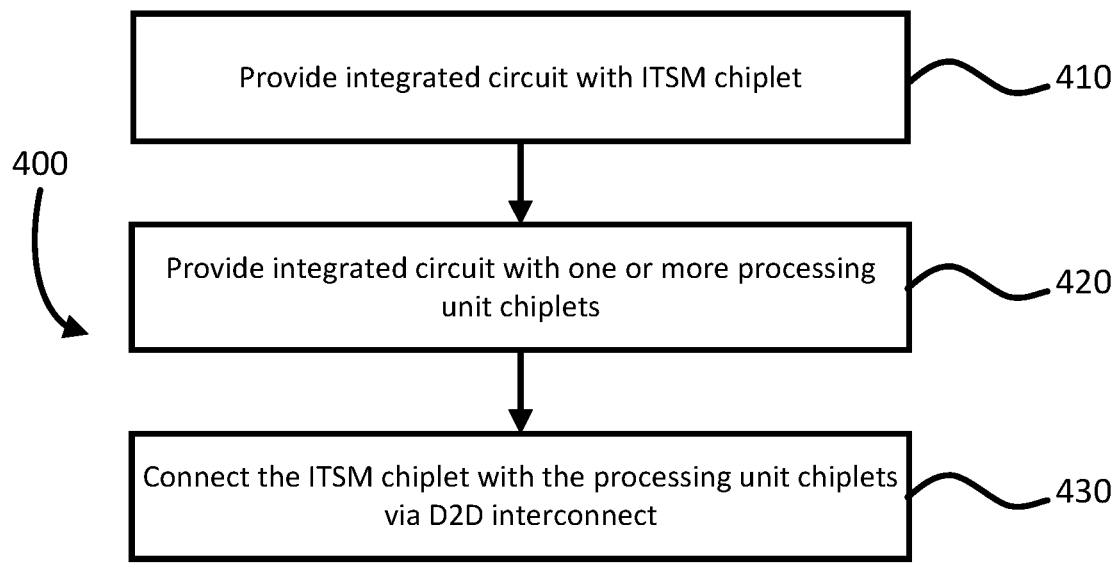
FIG. 4 depicts a flow diagram of an example process for assembling an integrated circuit according to aspects of the disclosure.

FIG. 4 depicts a flow diagram of an example process 400 for assembling an integrated circuit, such as the integrated circuit 100 as depicted in FIG. 1. The example process 400 can be performed on a system of one or more processors in one or more locations.

As shown in block 410, the system can provide the integrated circuit 100 with an ITSM chiplet, such as the ITSM chiplet 102 as depicted in FIG. 1. The system can configure the ITSM chiplet 102 to provision, manage, maintain, and/or monitor servers, such as in a datacenter for cloud computing services.

As shown in block 420, the system can provide the integrated circuit 100 with one or more processing unit chiplets, such as the processing unit chiplets 106 as depicted in FIG. 1. The system can configure the processing unit chiplets to execute instructions for one or more services, such as cloud computing services.

As shown in block 430, the system can connect the ITSM chiplet 102 with the processing unit chiplets 106 via a D2D interconnect, such as the D2D interconnect 112 as depicted in FIG. 1. The system can configure the D2D interconnect to physically isolate the ITSM chiplet 102 from the processing unit chiplets 106.

Assembling an integrated circuit with chiplets can reduce potential manufacturing defects when the PCB is assembled, as there are less components to assemble onto the PCB. The chiplet connections can be tested when assembling the integrated circuit and do not need to be tested when the PCB is assembled.

Figure 5:
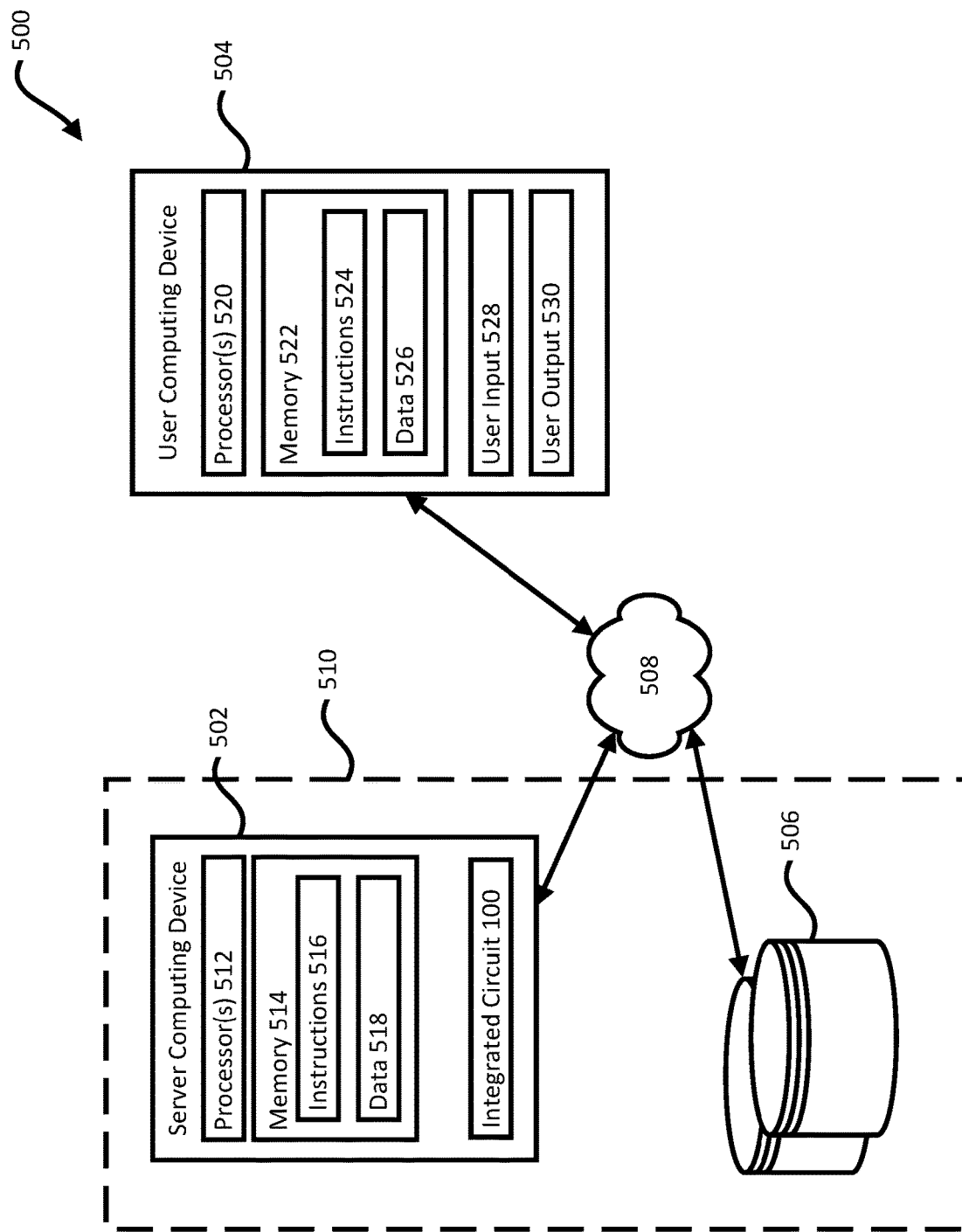
FIG. 5 depicts a block diagram of an example computing environment for implementing an integrated circuit according to aspects of the disclosure.

FIG. 5 depicts a block diagram of an example computing environment 500 for implementing an integrated circuit, such as the integrated circuit 100 with the ITSM chiplet 102 and processing unit chiplets 106 as depicted in FIG. 1. The integrated circuit 100 can be implemented in a device, such as in a server computing device 502. A user computing device 504 and the server computing device 502 can be communicatively coupled to one or more storage devices 506 over a network 508. The server computing device 502 and storage devices 506 can form part of a computing platform 510. The computing platform 510 can be a cloud computing platform, offering a variety of different services, for example for providing compute and storage resources to users of the platform.

The storage devices 506 can be a combination of volatile and non-volatile memory and can be at the same or different physical locations than the computing devices 502, 504. For example, the storage devices 506 can include any type of non-transitory computer readable medium capable of storing information, such as a hard-disk drive (HDD), solid state drive (SSD), tape drive, optical storage, memory card, ROM, RAM, DVD, CD-ROM, write-capable, and read-only memories.

The server computing device 502 can include one or more processors 512 and memory 514. The memory 514 can store information accessible by the processors 512, including instructions 516 that can be executed by the processors 512. The memory 514 can also include data 518 that can be retrieved, manipulated, or stored by the processors 512. The memory 514 can be a type of non-transitory computer readable medium capable of storing information accessible by the processors 512, such as volatile and non-volatile memory. The processors 512 can include one or more central processing units (CPUs), graphic processing units (GPUs), field-programmable gate arrays (FPGAs), and/or application-specific integrated circuits (ASICs), such as tensor processing units (TPUs).

The instructions 516 can include one or more instructions that when executed by the processors 512, cause the one or more processors to perform actions defined by the instructions. The instructions 516 can be stored in object code format for direct processing by the processors 512, or in other formats including interpretable scripts or collections of independent source code modules that are interpreted on demand or compiled in advance. The instructions 516 can include instructions for the ITSM chiplet 102 in the integrated circuit 100, consistent with aspects of this disclosure.

The data 518 can be retrieved, stored, or modified by the processors 512 in accordance with the instructions 516. The data 518 can be stored in computer registers, in a relational or non-relational database as a table having a plurality of different fields and records, or as JSON, YAML, proto, or XML documents. The data 518 can also be formatted in a computer-readable format such as, but not limited to, binary values, ASCII, or Unicode. Moreover, the data 518 can include information sufficient to identify relevant information, such as numbers, descriptive text, proprietary codes, pointers, references to data stored in other memories, including other network locations, or information that is used by a function to calculate relevant data.

The user computing device 504 can also be configured similarly to the server computing device 502, with one or more processors 520, memory 522, instructions 524, and data 526. The user computing device 504 can also include a user input 528 and a user output 530. The user input 528 can include any appropriate mechanism or technique for receiving input from a user, such as keyboard, mouse, mechanical actuators, soft actuators, touchscreens, microphones, and sensors.

The server computing device 502 can be configured to transmit data to the user computing device 504, and the user computing device 504 can be configured to display at least a portion of the received data on a display implemented as part of the user output 530. The user output 530 can also be used for displaying an interface between the user computing device 504 and the server computing device 502. The user output 530 can alternatively or additionally include one or more speakers, transducers or other audio outputs, a haptic interface or other tactile feedback that provides non-visual and non-audible information to the platform user of the user computing device 504.

Although FIG. 5 illustrates the processors 512, 520 and the memories 514, 522 as being within the computing devices 502, 504, components described in this specification, including the processors 512, 520 and the memories 514, 522 can include multiple processors and memories that can operate in different physical locations and not within the same computing device. For example, some of the instructions 516, 524 and the data 518, 526 can be stored on a removable SD card and others within a read-only computer chip. Some or all of the instructions and data can be stored in a location physically remote from, yet still accessible by, the processors 512, 520. Similarly, the processors 512, 520 can include a collection of processors that can perform concurrent and/or sequential operation. The computing devices 502, 504 can each include one or more internal clocks providing timing information, which can be used for time measurement for operations and programs run by the computing devices 502, 504.

The server computing device 502 can be configured to receive requests to process data from the user computing device 504. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 504 may receive and transmit data specifying target computing resources to be allocated for executing a neural network trained to perform a particular neural network task.

The computing devices 502, 504 can be capable of direct and indirect communication over the network 508. The devices 502, 504 can set up listening sockets that may accept an initiating connection for sending and receiving information. The network 508 itself can include various configurations and protocols including the Internet, World Wide Web, intranets, virtual private networks, wide area networks, local networks, and private networks using communication protocols proprietary to one or more companies. The network 508 can support a variety of short- and long-range connections. The network 508, in addition or alternatively, can also support wired connections between the computing devices 502, 504, including over various types of Ethernet connection.

Although a single server computing device 502 and user computing device 504 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An integrated circuit comprising:
an information technology services management (ITSM) chiplet connected to a provisioning network, wherein the ITSM chiplet is configured to perform at least one of provisioning, managing, monitoring, or maintaining a server based on instructions received from the provisioning network; and
one or more processing unit chiplets;
wherein the ITSM chiplet is connected to the one or more processing unit chiplets via a die-to-die (D2D) interconnect, the D2D interconnect comprising a physical separation that physically isolates the ITSM chiplet from the one or more processing unit chiplets.

2. The integrated circuit of claim 1, wherein the ITSM chiplet is a segmented die fabricated with a particular functionality.

3. The integrated circuit of claim 1, wherein the physical separation is an air gap.

4. The integrated circuit of claim 1, further comprising a memory device, the memory device comprising at least one of a memory chiplet, memory component, or memory module.

5. The integrated circuit of claim 4, wherein the memory device is connected to the ITSM chiplet via a die-to-memory (D2M) interconnect.

6. The integrated circuit of claim 1, further comprising a system root of trust (RoT) configured to provide a security foundation for the one or more processing unit chiplets.

7. The integrated circuit of claim 6, wherein the ITSM chiplet comprises the system RoT or the ITSM chiplet is connected to the system RoT.

8. The integrated circuit of claim 1, wherein:
the one or more processing unit chiplets comprise a plurality of processing unit chiplets; and
the ITSM chiplet comprises a plurality of D2D interfaces to separately connect to each processing unit chiplet via a respective D2D interconnect.

9. The integrated circuit of claim 1, wherein the ITSM chiplet further comprises a virtualization offload accelerator configured to perform hypervisor software functionality.

10. A system comprising:
a plurality of integrated circuits, each integrated circuit comprising:
an information technology services management (ITSM) chiplet connected to a provisioning network, wherein the ITSM chiplet is configured to perform at least one of provisioning, managing, monitoring, or maintaining a server based on instructions received from the provisioning network; and
one or more processing unit chiplets;
wherein the ITSM chiplet is connected to the one or more processing unit chiplets via a die-to-die (D2D) interconnect, the D2D interconnect comprising a physical separation that physically isolates the ITSM chiplet from the one or more processing unit chiplets;
wherein the plurality of integrated circuits are connected by a daisy-chain of network interfaces.

11. The system of claim 10, wherein an integrated circuit of the plurality of integrated circuits comprises a real network interface exposed to a provisioning network.

12. The system of claim 11, wherein remaining integrated circuits of the plurality of integrated circuits each comprise a shared network interface.

13. The system of claim 10, wherein each ITSM chiplet further comprises a network switch configured to route provisioning traffic.

14. The integrated circuit of claim 10, wherein each ITSM chiplet is a segmented die of a respective integrated circuit and fabricated with a particular functionality.

15. The system of claim 10, wherein each integrated circuit further comprises a memory device, each memory device comprising at least one of a memory chiplet, memory component, or memory module.

16. The system of claim 15, wherein each memory device is connected to its respective ITSM chiplet via a die-to-memory (D2M) interconnect.

17. The system of claim 10, wherein each ITSM chiplet further comprises a virtualization offload accelerator configured to perform hypervisor software functionality.

18. A method for assembling an integrated circuit comprising:

provoking an information technology services management (ITSM) chiplet connected to a provisioning network, wherein the ITSM chiplet is configured to perform at least one of provisioning, managing, monitoring, or maintaining a server based on instructions received from the provisioning network;

providing one or more processing unit chiplets; and connecting the ITSM chiplet to the one or more processing unit chiplets via a die-to-die (D2D) interconnect, the D2D interconnect comprising a physical separation that physically isolates the ITSM chiplet from the one or more processing unit chiplets.

19. The method of claim 18, further comprising:

providing a memory device, the memory device comprising at least one of a memory chiplet, memory component, or memory module; and connecting the memory device to the ITSM chiplet via a die-to-memory (D2M) interconnect.

* * * * *